US012570330B2

(12) United States Patent
Suh et al.

(10) Patent No.:    US 12,570,330 B2
(45) Date of Patent:    Mar. 10, 2026

(54) METHOD AND APPARATUS FOR SETTING A DRIVING MODE OF A VEHICLE

(71) Applicants:HYUNDAI MOTOR COMPANY, Seoul (KR); KIA CORPORATION, Seoul (KR)

(72) Inventors: Jung Seok Suh, Yongin-si (KR); Hong Gyu Lee, Goyang-si (KR); Woo Hyun Kim, Suwon-si (KR); Ja Yoon Goo, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 179 days.

(21) Appl. No.: 17/861,358

(22) Filed: Jul. 11, 2022

(65) Prior Publication Data

US 2023/0227075 A1    Jul. 20, 2023

(30) Foreign Application Priority Data

Jan. 18, 2022    (KR) ........................ 10-2022-0007218

(51) Int. Cl.
*B60W 60/00* (2020.01)
*B60W 50/14* (2020.01)

(52) U.S. Cl.
CPC .......... *B60W 60/005* (2020.02); *B60W 50/14* (2013.01); *B60W 2050/146* (2013.01); *B60W 2540/229* (2020.02); *B60W 2552/05* (2020.02); *B60W 2720/106* (2013.01); *B60W 2720/125* (2013.01)

(58) Field of Classification Search
None
See application file for complete search history.

(56) References Cited

U.S. PATENT DOCUMENTS

| | | | |
|---|---|---|---|
| 10,474,147 B2 | 11/2019 | Park | |
| 10,962,378 B2 | 3/2021 | Cronin et al. | |
| 11,131,553 B1 * | 9/2021 | Lyle .................... | B60W 40/068 |
| 2015/0166058 A1 * | 6/2015 | Mizutani ............... | B60W 50/14 |
| | | | 701/1 |
| 2016/0311323 A1 * | 10/2016 | Lee ........................ | B60K 35/10 |
| 2017/0038775 A1 | 2/2017 | Park | |
| 2018/0266834 A1 | 9/2018 | Cronin et al. | |
| 2018/0290660 A1 * | 10/2018 | Huang .............. | B60W 60/0053 |
| 2018/0361972 A1 * | 12/2018 | Zagorski ............. | B60W 30/182 |
| 2019/0064839 A1 * | 2/2019 | Sakai ................... | G05D 1/0248 |
| 2023/0174077 A1 * | 6/2023 | Gohlke ................. | B60W 40/04 |
| | | | 701/1 |

(Continued)

FOREIGN PATENT DOCUMENTS

| | | |
|---|---|---|
| CN | 106364488 B | 6/2019 |
| EP | 3330827 A1 | 6/2018 |

(Continued)

*Primary Examiner* — Hongye Liang
(74) *Attorney, Agent, or Firm* — Lempia Summerfield Katz LLC

(57) ABSTRACT

A method and an apparatus for setting a driving mode of a vehicle are disclosed. The method performed by an in-vehicle apparatus for setting a driving mode includes: determining a state of an occupant, determining a type of road on which the vehicle is traveling, and setting the driving mode of the vehicle based on the state of the occupant and the type of the road.

20 Claims, 7 Drawing Sheets

(56)                    References Cited

U.S. PATENT DOCUMENTS

2023/0288928  A1*   9/2023  Singh ................ B60W 60/0059
2024/0253687  A1*   8/2024  Wang ..................... G06F 9/451

FOREIGN PATENT DOCUMENTS

KR        20170015240  A      2/2017
KR         102135088  B1     7/2020
KR        20200084384      *  7/2020

* cited by examiner

<u>10</u>

Start

Determine Occupant's State ～S500

Determine Road Type ～S510

Receive Input Of Preferred Driving Mode ～S520

Combine And Reflect Occupant's State, Road Type, And Preferred Driving Mode On Driving Mode Map ～S530

End

METHOD AND APPARATUS FOR SETTING A DRIVING MODE OF A VEHICLE

CROSS-REFERENCE TO RELATED APPLICATION

This application claims priority to and the benefit of Korean Patent Application Number 10-2022-0007218, filed Jan. 18, 2022, the entire contents of which are incorporated herein by reference.

TECHNICAL FIELD

The present disclosure relates to a method of and an apparatus for setting a driving mode of a vehicle.

BACKGROUND

The statements in this section merely provide background information related to the present disclosure and do not necessarily constitute prior art.

Accelerated development of technology is ongoing to allow driving assistance to ensure driver safety and provide driving convenience and realize autonomous driving for enabling a vehicle to drive itself on a road without driver intervention.

Vehicles may provide various driving modes. However, the existing vehicles have a limitation in that they can only follow a user's selected input to provide a fixed driving mode.

SUMMARY

According to at least one embodiment, the present disclosure provides a method performed by an in-vehicle apparatus for setting a driving mode of a vehicle. The method includes: determining a state of an occupant, determining the type of road on which the vehicle is traveling, and setting the driving mode of the vehicle based on the state of the occupant and the type of the road.

According to another embodiment, the present disclosure provides an apparatus for setting a driving mode of a vehicle. The apparatus includes: a controller configured to: determine a state of an occupant inside the vehicle, determine the type of road on which the vehicle is traveling, and set a driving mode of the vehicle based on the state of the occupant and the type of the road.

According to yet another embodiment, the present disclosure provides a vehicle including: a sensing unit configured to obtain information on an occupant, a navigation information acquisition unit configured to obtain navigation information of the vehicle, and a controller configured to determine the state of the occupant based on the information on the occupant. In particular, the controller is configured to determine a type of road on which the vehicle is traveling based on the navigation information, and further configured to set a driving mode of the vehicle based on the state of the occupant and the type of the road.

BRIEF DESCRIPTION OF THE DRAWINGS

In order that the disclosure may be well understood, there will now be described various forms thereof, given by way of example, reference being made to the accompanying drawings, in which.

Figure 1:
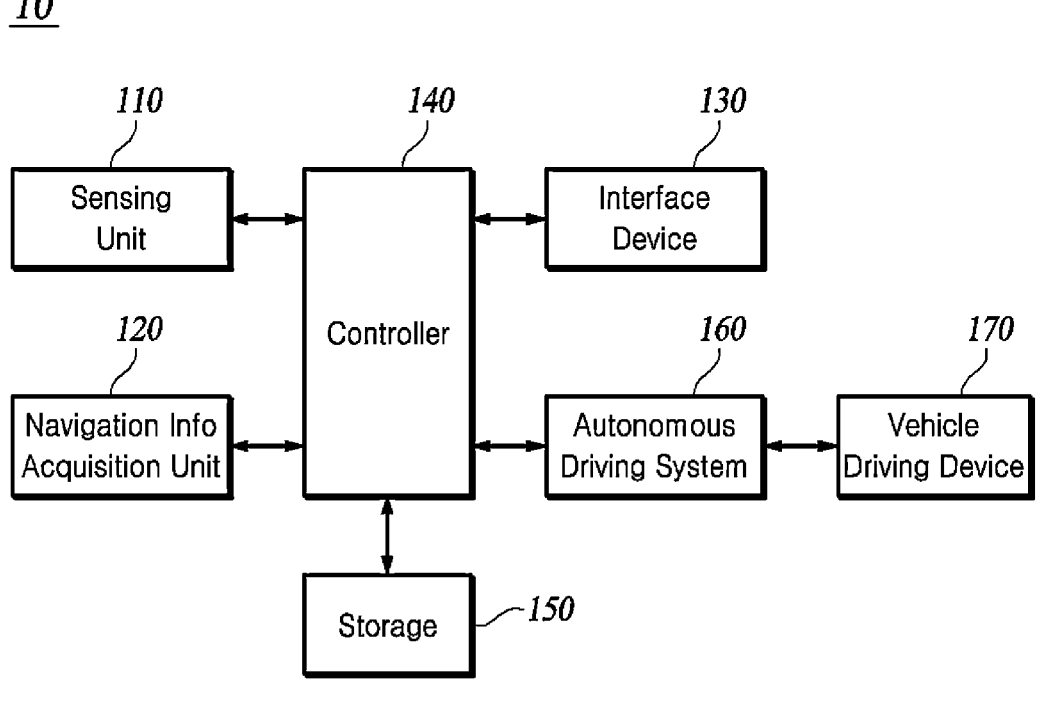
FIG. 1 is a block diagram illustrating components of a vehicle according to at least one exemplary embodiment of the present disclosure.

The drawings described herein are for illustration purposes only and are not intended to limit the scope of the present disclosure in any way.

DETAILED DESCRIPTION

The present disclosure in some embodiments provides a method and an apparatus for allowing a driving mode of a vehicle to be set based on an occupant's state and road information.

The present disclosure in other embodiments provides a method and an apparatus for setting a driving mode of a vehicle, which can learn a preferred driving mode of an occupant corresponding to the occupant's state and road information and reflect the learning in setting the driving mode of the vehicle.

The issues to be solved by the present disclosure are not limited to those mentioned above, and other unmentioned issues to be resolved by the present disclosure should be clearly understood by those of having ordinary skill in the art from the following description.

Hereinafter, some embodiments of the present disclosure are described in detail with reference to the accompanying drawings. In the following description, like reference numerals designate like elements, although the elements are shown in different drawings. Further, in the following description of some embodiments, a detailed description of related known components and functions when considered to obscure the subject of the present disclosure are omitted for the purpose of clarity and for brevity.

In describing the components of the embodiments, alphanumeric codes may be used such as first, second, i), ii), a), b), etc., solely for the purpose of differentiating one component from others but not to imply or suggest the substances, the order, or sequence of the components. Throughout the present disclosure, when parts "include" or "comprise" a component, they are meant to further include other components, not to exclude thereof unless there is a particular description contrary thereto.

When a component, device, element, or the like of the present disclosure is described as having a purpose or performing an operation, function, or the like, the component, device, or element should be considered herein as being "configured to" meet that purpose or to perform that operation or function.

The description of the present disclosure to follow in conjunction with the accompanying drawings is intended to describe exemplary embodiments of the present disclosure and is not intended to represent the only embodiments in which the technical idea of the present disclosure may be practiced.

FIG. 1 is a block diagram illustrating components of a vehicle 10 according to at least one exemplary embodiment of the present disclosure.

As shown in FIG. 1, the vehicle 10 may include: a sensing unit 110, a navigation information acquisition unit 120, an interface device 130, a controller 140, a storage 150, an autonomous driving system 160, and vehicle driving devices 170. The components may each be a device or logic installed in the vehicle 10 and may mean a unit that processes at least one function or operation, which may be implemented as hardware or software or a combination of hardware and software. Not all blocks shown in FIG. 1 are requisite components, and some blocks included in the vehicle 10 may be added, changed, or deleted in other embodiments.

The components may each exchange a signal through an internal communication system (not shown). The signal may contain data. The internal communication system may use at least one communication protocol (e.g., CAN, LIN, FlexRay, MOST, Ethernet).

The driving mode setting apparatus according to at least one embodiment of the present disclosure may include at least one of a device and a logic installed in the vehicle 10. For example, the driving mode setting apparatus may include the controller 140 and the storage 150. In other embodiments, the driving mode setting apparatus may further include any one or more of the sensing unit 110, the navigation information acquisition unit 120, and the interface device 130, or it is functionally integrated and implemented with the autonomous driving system 160.

The sensing unit 110 may be configured to obtain information regarding the occupant inside the vehicle 10. Here, the information regarding the occupant may include: a captured image of the occupant, the occupant's voice, and/or occupant's bio-signals (e.g., heart rate, etc.). The sensing unit 110 is implemented as at least one of a camera or cameras for photographing the interior of the vehicle 10, a microphone for receiving the occupant's voice, and various sensing devices capable of sensing the occupant's bio-signals.

The navigation information acquisition unit 120 may be configured to obtain navigation information of the vehicle 10. The navigation information may include location information of the vehicle 10 and/or map information corresponding to the location information, route information, and information about a road on which the vehicle 10 is traveling. The information on the road may include information on the type of road, its curvature, slope, road width, road construction information, and/or the road surface condition. The type of road may include a highway, an intercity or suburban road, or a city road.

The navigation information acquisition unit 120 may be configured to extract map information corresponding to the current location from among the pre-stored map information based on the current location of the vehicle 10 received from the GPS receiver or extracts the map information corresponding to the current location from an external server using V2X communication. Map information corresponding to the location can be collected. The navigation information acquisition unit 120 may be implemented as a GPS receiver, a communication module, and/or a navigation device.

The interface device 130 may be a device for communication between the vehicle 10 and the occupant. The interface device 130 may be configured to receive an input for setting or changing setting values of various functions and may be configured to provide the occupant with information generated in the vehicle 10. To this end, the interface device 130 may include an input device and/or an output device.

The input device may be implemented as, but is not limited to, at least one physical button, a touch panel and/or a microphone, and it may also be implemented in other ways as long as they receive predetermined information from the occupant. According to some exemplary embodiments, the input device may be combined with the output device to be implemented as a touch display or the like.

The output device may be implemented as, but is not limited to, a display that visually provides information generated in the vehicle 10, a speaker that audibly provides information generated in the vehicle 10, and/or a vibration module that tactually provides information generated in the vehicle 10, and it may also be implemented by other means as long as they can provide information generated in the vehicle 10.

The controller 140 may be configured to interwork with the sensing unit 110, the navigation information acquisition unit 120, the interface device 130, the storage 150, the autonomous driving system 160, and/or the vehicle driving device 170 in order to perform calculations and control related to driving mode setting. The controller 140 may include one or more processors. The controller 140 may be implemented as one or more electronic control units (ECUs), microcontroller units (MCUs), or other sub-controllers mounted on the vehicle 10.

The controller 140 may be configured to set any one of a plurality of predefined driving modes as the driving mode of the vehicle 10. The plurality of predefined driving modes may include, but is not limited to, one or more of a fast driving mode, a normal driving mode, a defensive driving mode, and a custom driving mode. For example, the plurality of predefined driving modes may include a plurality of custom driving modes.

Table 1 shows example driving modes according to at least one embodiment of the present disclosure.

TABLE 1

| Driving Mode | Chassis Control Mode | Longitudinal Accel/Decel Control Level | Lateral Accel/Decel Control Level | Defensive Driving Degree |
|---|---|---|---|---|
| Fast Driving Mode | Sport Mode | Top | Top | Short-distance Preceding Driving |
| Normal Driving Mode | Normal Mode | Mid | Mid | Medium-distance Moderate Yield Driving |
| Defensive Driving Mode | Comfort Mode | Low | Low | Long-distance Yield Driving |
| Custom Driving Mode | Select 1 | Select 1 | Select 1 | Select 1 |

As shown in Table 1, driving modes may each have control element data defined for serving as a reference for a driving plan generation and/or motion control of the vehicle 10. The control element data may include a chassis control mode, a longitudinal acceleration/deceleration control level, a lateral acceleration/deceleration control level, and/or a defensive driving degree.

The chassis control mode may be a sport mode, a normal mode, or a comfort mode. The closer to the sport mode from the comfort mode, the heavier the steering feel may be provided while the suspension becomes lower in height and stiffer in strength.

The longitudinal and lateral acceleration/deceleration control levels may be top, mid, or low. As the acceleration/deceleration control level goes from 'Low' to 'Top', the vehicle 10 may accelerate or decelerate faster.

The degree of defensive driving may be short-distance preceding driving, medium-distance moderate yield driving, or long-distance yield driving. The closer the degree of defensive driving goes to the long-distance yielding driving from the short-distance preceding driving, the greater distance the vehicle 10 may maintain from other vehicles, have more distance to decelerate, and yield better to surrounding vehicles.

The controller 140 may be configured to receive control element data for the custom driving mode from the occupant by using the interface device 130. For example, the occupant may set the chassis control mode of the custom driving mode to any one of sport mode, normal mode, and comfort mode, it may set the longitudinal and lateral acceleration/deceleration control levels to any one of top, mid, and low, and it may set the degree of defensive driving to any one of short-distance preceding driving, medium-distance moderate yield driving, and long-distance yield driving.

The controller 140 may be configured to set the driving mode of the vehicle 10 based on data obtained from the sensing unit 110, the navigation information acquisition unit 120, and/or the interface device 130.

The controller 140 may be configured to determine the task being performed by the occupant based on the information on the occupant obtained from the sensing unit 110. For example, the controller 140 may determine whether the occupant is sleeping, on a call, reading, and/or video watching, based on a captured image of the occupant. As another example, the controller 140 may determine whether the occupant is in conversation based on the occupant's voice or the like.

According to some exemplary embodiments, the controller 140 may be configured to determine the task being performed by the occupant by using other information than information on the occupant obtained from the sensing unit 110. For example, the controller 140 may be configured to determine whether the occupant is listening to music based on audio information outputted by an audio-video navigation (AVN) device mounted on the vehicle 10.

The controller 140 may be configured to determine a task type corresponding to the task being performed by the occupant from among multiple task types.

According to some exemplary embodiments, the controller 140 may be configured to utilize a task classification table which is a table defining the relationship between tasks and task types as a basis for determining the task type corresponding to the task being performed by the occupant. Table 2 shows an example task classification table.

TABLE 2

| Task Difficulty | Task |
|---|---|
| Top Difficulty | Laptop Use, Tablet Use, Reading, Etc. |
| Mid Difficulty | Sleeping, Video Watching, Mobile Search, Etc. |
| Low Difficulty | Calling, Staring Outside, Talking, Music Listening, Etc. |

As shown in Table 2, the controller 140 may be configured to determine a task type corresponding to the task based on the degree of concentration required to perform the task. Here, the task type may be the difficulty of the task. For example, the task difficulty may be divided into top difficulty, mid difficulty, and low difficulty. The top difficulty may correspond to tasks requiring a high degree of concentration to perform, the mid difficulty to tasks requiring ordinary concentration, and the low difficulty to tasks requiring a relatively low degree of concentration.

For example, in response to determining that the task being performed by the occupant is any one of laptop use, tablet use, reading, and the like, the controller 140 may determine the task type to be of the top difficulty. In response to determining that the task being performed by the occupant is any one of sleep, video watching, mobile search, and the like, the controller 140 may determine the task type to be of the mid difficulty. In response to determining that the task being performed by the occupant is any one of a call, staring outside, talking, listening to music, and the like, the controller 140 may determine the task type to be of low difficulty.

Meanwhile, a task classification table such as Table 2 may be preset by a manufacturer or an occupant. For example, the occupant may use the interface device 130 to set tasks to be classified into their respective difficulties.

According to other exemplary embodiments, the controller 140 may be configured to determine the concentration level of the occupant based on the information on the occupant obtained from the sensing unit 110 and accordingly determine a task type corresponding to the task being performed by the occupant. Here, the task type may be the task concentration of the occupant. For example, the task concentration may be classified into a top concentration, a mid concentration, and a low concentration.

For example, in response to determining that the gaze of the occupant does not deviate from a certain range for a first preset time or longer, the controller 140 may determine the task type to be in the top concentration. Additionally, in response to determining that the gaze of the occupant does not deviate from the certain range for less than the first preset time or longer than a second preset time, the controller 140 may determine the task type to be in the mid concentration. Additionally, in response to determining that the gaze of the occupant does not deviate from the certain range for less than the second preset time, the controller 140 may determine the task type to be in the low concentration.

Meanwhile, the present disclosure neither reiterates nor particularly limits the details of the method of determining the task being performed by the occupant or determining the concentration of the occupant based on the obtained information on the occupant from the sensing unit 110.

The controller 140 may be configured to determine the type of road on which the vehicle 10 is traveling based on the navigation information obtained from the navigation information acquisition unit 120. For example, the controller 140 may determine the type of road on which the vehicle 10 is traveling based on the location information of the vehicle 10 and/or map information corresponding to the location information. Here, the type of road may be any one of a highway section, a suburban section, or a city section.

The controller 140 may be configured to control the interface device 130 to output the state of the occupant and the type of road. Accordingly, the occupant may recognize the occupant's state and road type determined by the controller 140 through the information outputted by the interface device 130.

The controller 140 may be configuring to obtain the driving mode inputted by the interface device 130 from the occupant. For example, the occupant may select any one of the plurality of driving modes through the interface device 130.

The controller 140 may be configured to set the selected driving mode as the driving mode of the vehicle 10.

The controller 140 may be configured to combine the occupant's states, the road types, and the occupant's selected driving modes to generate a table (hereinafter, driving mode map) that defines relationships between the occupant's states, the road types, and the occupant's preferred driving modes.

According to some exemplary embodiments, the controller 140 may be configured to combine the occupant's state, road type, and the occupant's selected driving modes to reflect the occupant's tendency in the pre-generated driving mode map.

Table 3 shows an example driving mode map before the occupant's tendency is reflected.

TABLE 3

| | Highway Section | Suburban Section | City Section |
| --- | --- | --- | --- |
| Top Difficulty | Normal Driving Mode | Normal Driving Mode | Normal Driving Mode |
| Mid Difficulty | Normal Driving Mode | Normal Driving Mode | Normal Driving Mode |
| Low Difficulty | Normal Driving Mode | Normal Driving Mode | Normal Driving Mode |

Before the occupant's disposition is reflected, the preferred driving modes for each occupant's state and road type may all be set to a default driving mode (e.g., a normal driving mode).

Table 4 shows an example driving mode map in which the occupant's tendency is reflected.

TABLE 4

| | Highway Section | Suburban Section | City Section |
| --- | --- | --- | --- |
| Top Difficulty | Defensive Driving Mode | Defensive Driving Mode | Custom Driving Mode |
| Mid Difficulty | Fast Driving Mode | Normal Driving Mode | Defensive Driving Mode |
| Low Difficulty | Fast Driving Mode | Custom Driving Mode | Normal Driving Mode |

There may be an example case where the vehicle 10 is driving on the road type that is 'highway section', the task being performed by the occupant corresponds to the task type that is of 'top difficulty', and the occupant selects 'defense driving mode'. In this case, the controller 140 may update a preferred driving mode, corresponding to the 'top difficulty' and the 'highway section' on the driving mode map, to the 'defense driving mode'.

Meanwhile, in response to multiple citations made of the same occupant status and the same road type through the driving mode selections, the controller 140 may be configured to consider and reflect related data combined on the driving mode map. For example, the controller 140 may be configured to give weight to the number of times the driving mode is selected or the time spent driving in that driving mode and accordingly update the driving mode map with the preferred driving mode that is the most selected driving mode or the longest used driving mode about a specific occupant's state and a specific road type.

Based on the driving mode map, the controller 140 may be configured to set a preferred driving mode corresponding to the occupant's state and road type as the driving mode of the vehicle 10. For example, as shown in Table 4, the controller 140 may be configured to set the 'defense driving mode' as the driving mode of the vehicle 10 in response to determining that the task being performed by the occupant corresponds to the task type that is of 'top difficulty' and the vehicle 10 is driving on the road type that is 'highway section'.

The storage 150 may be configured to store various programs and data for setting a driving mode according to at least one embodiment of the present disclosure. For example, the storage 150 may be configured to store a program for the controller 140 to set the driving mode. As another example, the storage 150 may be configured to store criteria for classifying the types of tasks. As yet another example, the storage 150 may be configured to store a driving mode map defining preferred driving modes corresponding to each occupant's state and road type. As yet another example, the storage 150 may be configured to store control element data for each driving mode. The control element data may include a chassis control mode, a longitudinal acceleration/deceleration control level, a lateral acceleration/deceleration control level, and/or a defensive driving degree.

The autonomous driving system 160 may be configured to control the movement of the vehicle 10 based on the set driving mode.

According to some exemplary embodiments, the autonomous driving system 160 may be configured to generate a route for autonomous driving of the vehicle 10. The autonomous driving system 160 may be configured to generate a driving plan for driving along the generated route based on the driving mode of the vehicle 10. The autonomous driving system 160 may be configured to generate a signal for controlling the movement of the vehicle 10 according to the driving plan. The autonomous driving system 160 may be configured to electrically control the vehicle driving devices 170 in the vehicle 10 through the generated signal. The vehicle driving devices 170 may include a steering device, a braking device, a suspension device, and/or a power train.

According to some exemplary embodiments, the autonomous driving system 160 may include one or more processors and memory.

Figure 2:
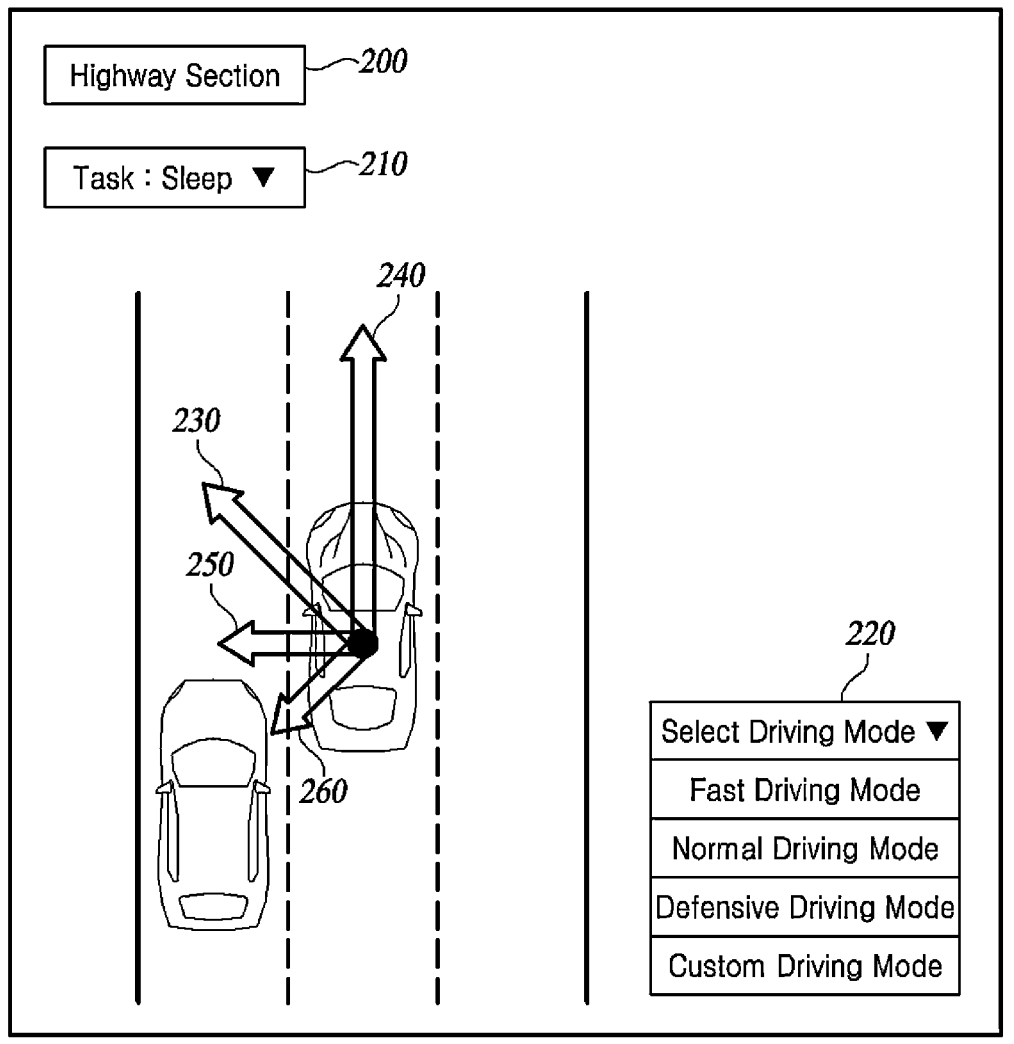
FIG. 2 is a diagram illustrating a GUI for setting a driving mode according to at least one exemplary embodiment of the present disclosure.

FIG. 2 is a diagram illustrating a graphic user interface (GUI) for setting a driving mode according to at least one exemplary embodiment of the present disclosure.

The interface device 130 may provide a GUI.

The GUI according to at least one exemplary embodiment of the present disclosure may include a first graphic object 200 for displaying the road type on which the vehicle 10 is traveling. The first graphic object 200 may include a text and/or an image indicating the road type on which the vehicle 10 is traveling.

The GUI may further include a second graphic object 210 for displaying the current state of the occupant. The second graphic object 210 may include a text and/or an image indicating a task being performed by the occupant. Here, the task being performed by the occupant may be any one of the tasks performed by the occupant within a preset time. For example, the second graphic object 210 may be a text or an image indicating a task that the occupant has performed the most within the last 5 minutes. The second graphic object 210 may further include a text or an image corresponding to the task being performed by the occupant.

According to some exemplary embodiments, the occupant may input a task by using the second graphic object 210. For example, the occupant may select any one of a plurality of tasks by touching one area of the second graphic object 210. For example, when the controller 140 erroneously determines the task being performed by the occupant or when the occupant wants to set a driving mode for another task to perform in the future, the occupant may change the task by using the second graphic object 210.

In another embodiment, the GUI may include a third graphic object 220 for receiving a driving mode input. The occupant may select any one of the plurality of driving modes by using the third graphic object 220. For example, the occupant may touch one region of the third graphic object 220 for selecting any one of a fast driving mode, a normal driving mode, a defensive driving mode, and a custom driving mode.

In other embodiment, the GUI may include at least one or more graphic objects 230 to 260 for displaying information on the current driving mode of the vehicle 10. Here, the current driving mode may be a driving mode selected by the occupant or a driving mode determined by the controller 140.

At least one or more graphic objects 230 to 260 may correspond to control element data of the driving mode, respectively. For example, the GUI may include a fourth graphic object 230 corresponding to the chassis control mode, a fifth graphic object 240 corresponding to the longitudinal acceleration/deceleration control level, and a sixth graphic object 250 corresponding to the lateral acceleration/deceleration control level, and/or a seventh graphic object 260 corresponding to the degree of defensive driving.

At least one or more graphic objects 230 to 260 may be arrow images each indicating a control level or control degree of each control element data. The length or color of at least one or more graphic objects 230 to 260 may vary according to a control level or control degree of control element data. For example, as the lateral acceleration/deceleration control level of the driving mode goes from 'Top' to 'Low', the length of the sixth graphic object 250 may become shorter.

Meanwhile, in response to a touch being applied to one area of the third graphic object 220, the controller 140 may determine the selected driving mode as the preferred driving mode corresponding to the occupant's current state and the type of road on which the vehicle 10 is currently driving. There may be an example case where the vehicle 10 is driving on the road type that is 'highway section', the task that the occupant has performed the most within the last 5 minutes is 'sleep', and the occupant selects a fast driving mode by touching one area of the third graphic object 220. In this case, the controller 140 may determine the fast driving mode as the preferred driving mode corresponding to a 'task of mid difficulty' and the 'highway section'.

Figure 3:
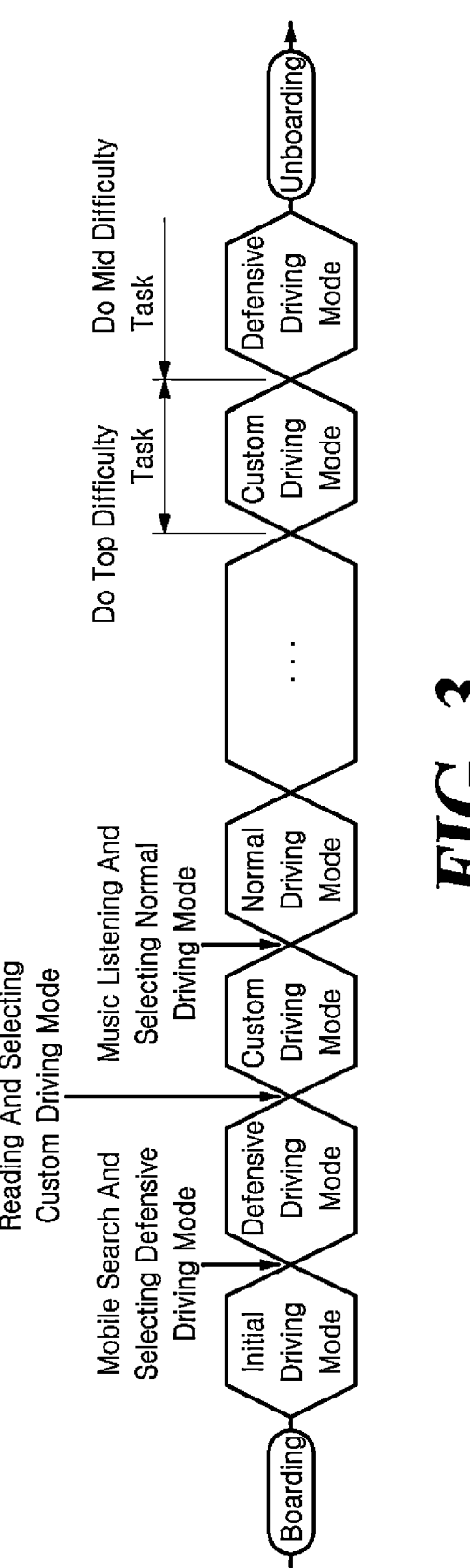
FIG. 3 is a diagram illustrating a process of setting a driving mode with a constant type of road on which a vehicle is traveling according to at least one exemplary embodiment of the present disclosure.

FIG. 3 is a diagram illustrating a process of setting a driving mode with a constant type of road on which a vehicle is traveling according to at least one exemplary embodiment of the present disclosure.

The following describes a case where the vehicle 10 is driving on the type of road that is a city section as an example which is for convenience of description but does not limit the present disclosure.

When the occupant boards the vehicle 10 for the first time, the vehicle 10 begins driving in a preset initial driving mode (e.g., a normal driving mode).

When the occupant selects a defensive driving mode through the interface device 130 while performing a mobile search, the driving mode setting apparatus may set the preferred driving mode, which corresponds to the currently used road type and the difficulty of mobile search, to the defensive driving mode. For example, the driving mode setting apparatus may update the driving mode map to provide the 'defense driving mode' with the preferred driving mode corresponding to the 'city section' and the 'mid difficulty'. Additionally, the driving mode setting apparatus may set the driving mode of the vehicle 10 to the defensive driving mode for the vehicle 10 to run in the defensive driving mode.

When the occupant selects a custom driving mode through the interface device 130 while reading, the driving mode setting apparatus may set the preferred driving mode, which corresponds to the currently used road type and to the difficulty of reading, to the custom driving mode. For example, the driving mode setting apparatus may update the driving mode map to provide the 'custom driving mode' with the preferred driving mode corresponding to the 'city section' and the 'top difficulty'. Additionally, the driving mode setting apparatus may set the driving mode of the vehicle 10 to the custom driving mode for the vehicle 10 to run in the custom driving mode.

When the occupant selects a normal driving mode through the interface device 130 while listening to music, the driving mode setting apparatus may set the preferred driving mode, which corresponds to the currently used road type and to the difficulty of listening to music, to the normal driving mode. For example, the driving mode setting apparatus may update the driving mode map to provide the 'normal driving mode' with the preferred driving mode corresponding to the 'city section' and the 'low difficulty'. Additionally, the driving mode setting apparatus may set the driving mode of the vehicle 10 to the normal driving mode for the vehicle 10 to run in that mode.

This series of processes may configure a driving mode map reflecting the tendency of the occupant. For example, the driving mode map as shown in Table 4 may be configured.

Thereafter, when the occupant performs a task corresponding to the 'top difficulty' (e.g., using a laptop computer, using a tablet, reading, etc.), the driving mode setting apparatus may set the driving mode of the vehicle 10 to the preferred driving mode corresponding to the 'city section' and the 'top difficulty', that is, the 'custom driving mode'. Accordingly, the vehicle 10 runs in the custom driving mode.

When the occupant performs a task corresponding to 'mid difficulty' (e.g., sleeping, video watching, or mobile search, etc.), the driving mode setting apparatus may set the driving mode of the vehicle 10 to the preferred driving mode corresponding to 'city section' and 'mid difficulty', that is, the 'defense driving mode'. Accordingly, the vehicle 10 runs in the defensive driving mode.

According to at least one exemplary embodiment of the present disclosure, the driving mode map is configured based on the type of task, allowing the driving mode of the same level to be provided between the preceding task performed by the occupant and the subsequent task performed even if the tasks are different but equally classified into the same type to satisfy the needs of the occupant.

Figure 4A:
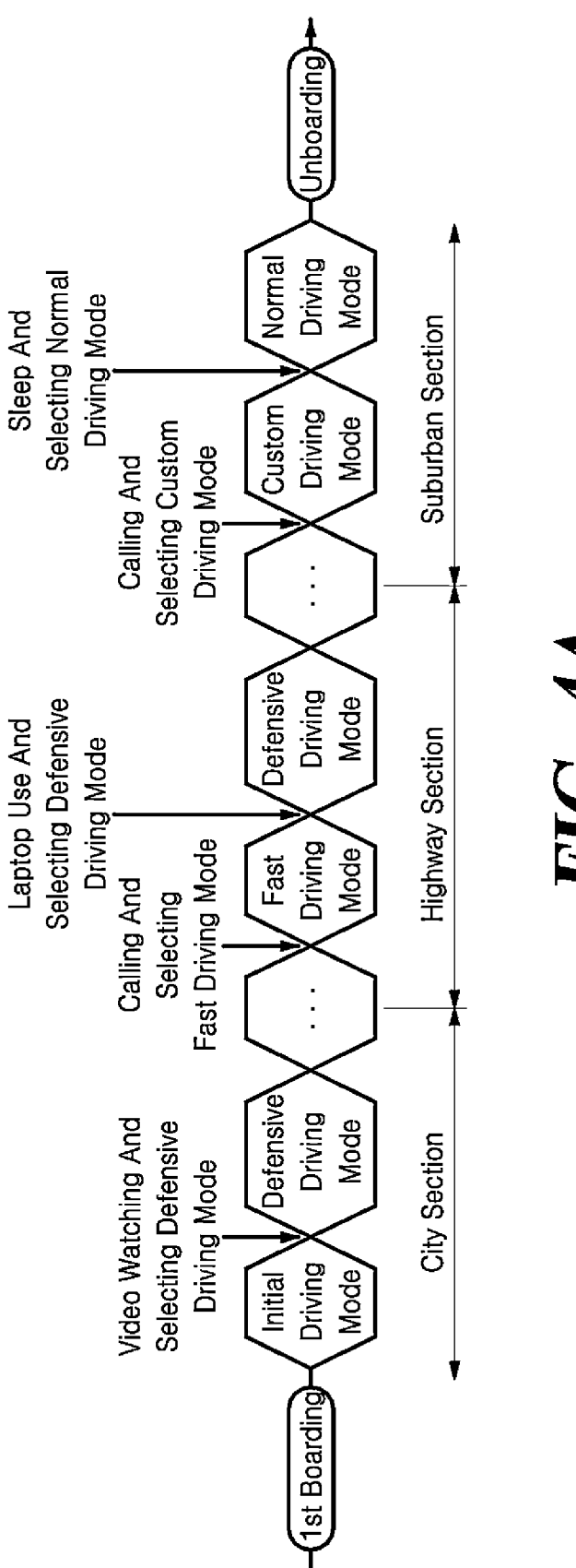
FIGS. 4A and 4B illustrate processes of setting a driving mode over varying types of road on which a vehicle is traveling according to at least one exemplary embodiment of the present disclosure.
Figure 4B:
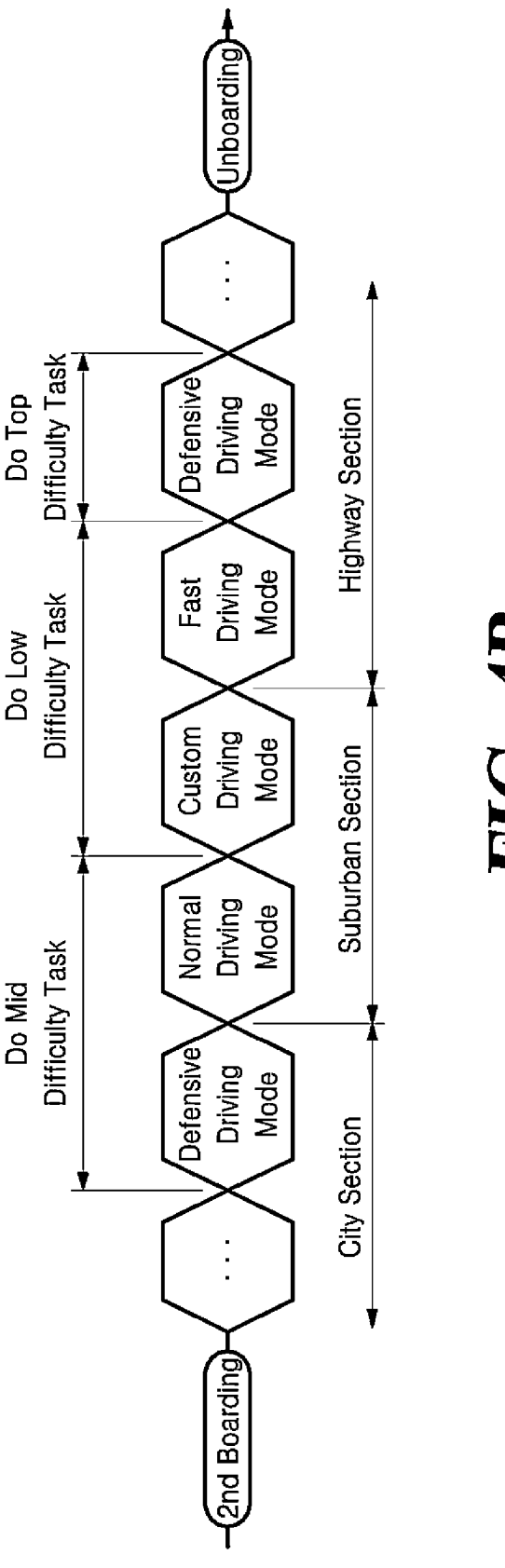

FIGS. 4A and 4B illustrate example processes of setting a driving mode over varying types of road on which a vehicle is traveling according to at least one exemplary embodiment of the present disclosure.

FIG. 4A illustrates an example process of configuring a driving mode map reflecting the disposition of the occupant based on the occupant's input.

When the occupant boards the vehicle 10 for the first time, the vehicle 10 begins driving in a preset initial driving mode (e.g., a normal driving mode).

When the vehicle 10 is driving in a city section and the occupant selects a defensive driving mode through the interface device 130 for safer driving while watching a video, the driving mode setting apparatus may set the preferred driving mode, corresponding to the currently used road type and to the difficulty of video watching, to defensive driving mode. For example, the driving mode setting apparatus may update the driving mode map to provide the 'defense driving mode' with the preferred driving mode corresponding to the 'city section' and the 'mid difficulty'. Additionally, the driving mode setting apparatus may set the driving mode of the vehicle 10 to the defensive driving mode for the vehicle 10 to run in that mode.

When the vehicle 10 is driving on a highway section and the occupant selects a fast driving mode through the interface device 130 while making a call, the driving mode setting apparatus may set the preferred driving mode, corresponding to the currently used road type and to the difficulty of calling, to the fast driving mode. For example, the driving mode setting apparatus may update the driving mode map to provide the 'fast driving mode' with the preferred driving mode corresponding to the 'highway section' and to the 'low difficulty'. Additionally, the driving mode setting apparatus may set the driving mode of the vehicle 10 to the fast driving mode for the vehicle 10 to run in that mode.

When the vehicle 10 is driving a highway section and the occupant selects a defensive driving mode through the interface device 130 while using a laptop, the driving mode setting may set the preferred driving mode, corresponding to the currently used road type and to the difficulty of laptop use, to the defensive driving mode. For example, the driving mode setting apparatus may update the driving mode map to provide the 'defense driving mode' with the preferred driving mode corresponding to the 'highway section' and to the 'top difficulty'. Additionally, the driving mode setting apparatus may set the driving mode of the vehicle 10 to the defensive driving mode for the vehicle 10 to run that mode.

When the vehicle 10 is driving the suburban section and the occupant selects a custom driving mode through the interface device 130 while making a call, the driving mode setting apparatus may set the preferred driving mode, corresponding to the currently used road type and to the difficulty of calling, to the custom driving mode. For example, the driving mode setting apparatus may update the driving mode map to provide the 'custom driving mode' with the preferred driving mode corresponding to the 'suburban section' and to the 'low difficulty'. Additionally, the driving mode setting apparatus may set the driving mode of the vehicle 10 to the custom driving mode for the vehicle 10 to run in that mode.

When the vehicle 10 is driving the suburban section and the occupant selects a normal driving mode through the interface device 130 and sleeps, the driving mode setting apparatus may set the preferred driving mode, corresponding to the currently used road type and to the difficulty of sleeping, to the normal driving mode. For example, the driving mode setting apparatus may update the driving mode map to provide the 'normal driving mode' with the preferred driving mode corresponding to the 'suburban section' and the 'mid difficulty'. Additionally, the driving mode setting apparatus may set the driving mode of the vehicle 10 to the normal driving mode for the vehicle 10 to run in that mode.

This series of processes may configure a driving mode map reflecting the tendency of the occupant. For example, the driving mode map as shown in Table 4 may be configured.

FIG. 4B illustrates a process of setting a driving mode based on the driving mode map according to Table 4.

When the occupant in the vehicle 10 running in the city section performs a task corresponding to the 'mid difficulty' (e.g., sleeping, video watching, or mobile search, etc.), the driving mode setting apparatus may set as the driving mode of the vehicle 10 the preferred driving mode corresponding to the 'city section' and 'mid difficulty', that is, the 'defense driving mode'. Accordingly, the vehicle 10 runs in the defensive driving mode. Thereafter, when the vehicle 10 moves from the city section to the suburban section, the driving mode setting apparatus may set the driving mode of the vehicle 10 to the preferred driving mode corresponding to the 'suburban section' and 'mid difficulty', that is, the 'normal driving mode'. Accordingly, the vehicle 10 drives in the normal driving mode.

When the occupant in the vehicle 10 running in the suburban section performs a task corresponding to 'low difficulty' (e.g., calling, staring outside, talking, listening to music, etc.), the driving mode setting apparatus may set the driving mode of the vehicle 10 to the preferred driving mode corresponding to 'suburban section' and 'low difficulty', that is, 'custom driving mode'. Accordingly, the vehicle 10 drives in the custom driving mode. Afterward, when the vehicle 10 moves from the suburban section to the highway section, the driving mode setting apparatus may set the driving mode of the vehicle 10 to the preferred driving mode corresponding to the 'highway section' and 'low difficulty', that is, the 'fast driving mode'. Accordingly, the vehicle 10 drives in the fast driving mode.

When the occupant in the vehicle 10 driving on the highway section performs a task corresponding to 'top difficulty' (e.g., laptop use, tablet use, or reading, etc.), the driving mode setting apparatus may set the driving mode of the vehicle 10 to the preferred driving mode corresponding to the 'highway section' and the 'top difficulty', that is, the 'defense driving mode'. Accordingly, the vehicle 10 drives in the defensive driving mode.

According to at least one exemplary embodiment of the present disclosure, the driving mode map is configured based on the road type on which the vehicle is driving, allowing the driving mode of the same level to be provided even between different roads classified into the same type but running toward different destinations or along different routes of the vehicle 10 to satisfy the needs of the occupant.

Figure 5:
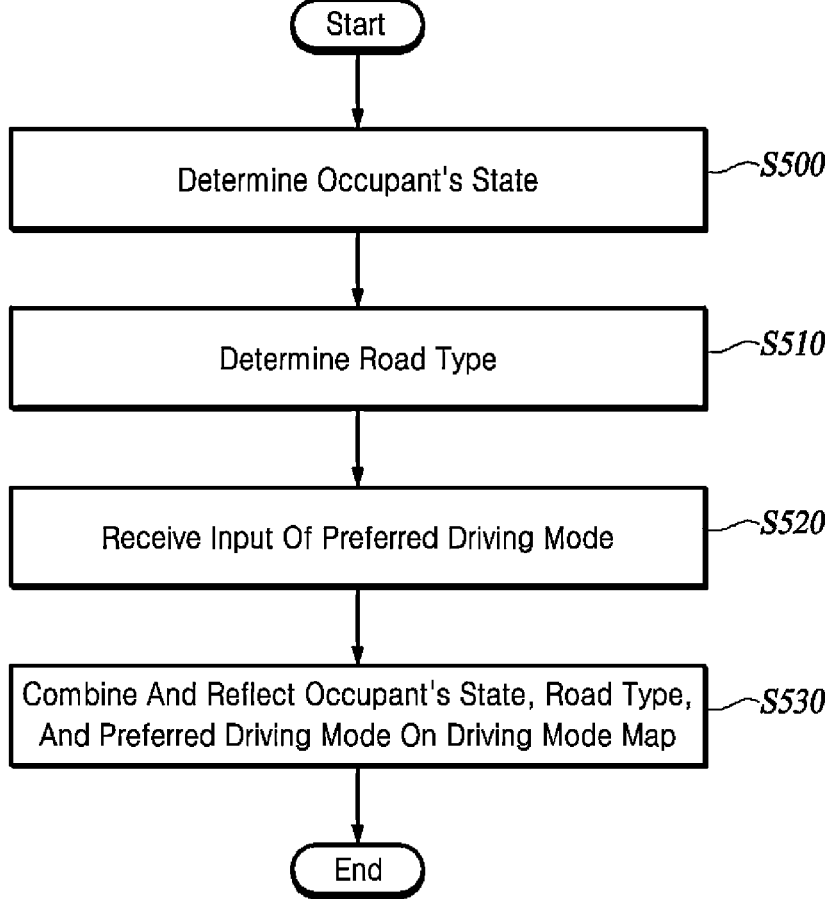
FIG. 5 is a flowchart of a method of configuring a driving mode map according to at least one exemplary embodiment of the present disclosure.

FIG. 5 is a flowchart depecting a method of configuring a driving mode map according to at least one exemplary embodiment of the present disclosure.

Since the method shown in FIG. 5 may be performed by the above-described driving mode setting apparatus or the vehicle 10 having the same, reiterative details thereof are omitted.

The driving mode setting apparatus determines the state of the occupant (S500). The occupant's state may include a task the occupant is performing and/or a type corresponding to the task the occupant is performing.

The driving mode setting apparatus may determine, from among a plurality of task types, a type corresponding to the task being performed by the occupant. Here, the type corresponding to the task being performed by the occupant may be determined based on the degree of concentration desired to perform the task. For example, the type corresponding to the task being performed by the occupant may be any one of top difficulty, mid difficulty, and low difficulty.

The driving mode setting apparatus may receive information on the task from the occupant. The driving mode setting apparatus may control the interface device 130 to display screen related to the task. The screen related to the task may include a graphic object for inputting the task.

The driving mode setting apparatus determines the road type on which the vehicle 10 is driving (S510).

The driving mode setting apparatus may determine any one of a plurality of road types as the road type on which the vehicle 10 is traveling, based on the location of the vehicle 10. Here, the plurality of road types may include one or more of a highway section, a city section, and a suburban section.

The driving mode setting apparatus receives information on the preferred driving mode (S520).

To this end, the driving mode setting apparatus may control the interface device 130 to display screen related to the driving mode setting. The screen related to the driving mode setting may include a graphic object for inputting the preferred driving mode.

The driving mode setting apparatus combines and reflects the occupant's state, the type of road, and the preferred driving mode on the driving mode map (S530). The driving mode setting apparatus may update the driving mode map based on the combination of the occupant's state, the type of road, and the preferred driving mode.

Figure 6:
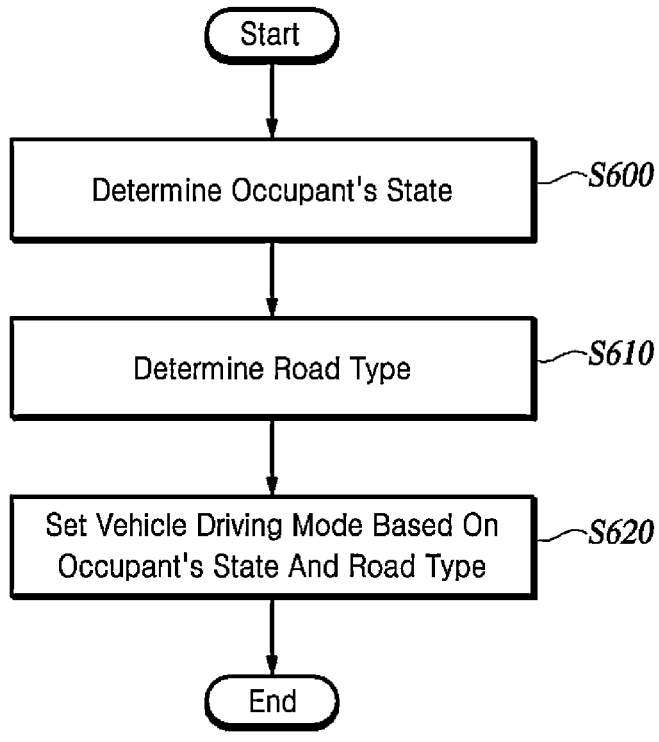
FIG. 6 is a flowchart illustrating a method of setting a driving mode according to at least one exemplary embodiment of the present disclosure.

FIG. 6 is a flowchart depicting a method of setting a driving mode according to at least one exemplary embodiment of the present disclosure.

Since the method shown in FIG. 6 may be performed by the above-described driving mode setting apparatus or the vehicle 10 having the same, a redundant description thereof is omitted.

The driving mode setting apparatus determines the state of the occupant (S600). The occupant's state may include a task the occupant is performing and/or a type corresponding to the task the occupant is performing.

The driving mode setting apparatus may determine a type corresponding to the task being performed by the occupant from among a plurality of task types. Here, the type corresponding to the task being performed by the occupant may be determined based on the degree of concentration desired to perform the task. For example, the type corresponding to the task being performed by the occupant may be any one of top difficulty, mid difficulty, and low difficulty.

The driving mode setting apparatus may receive information on the task from the occupant. The driving mode setting apparatus may control the interface device 130 to display screen related to the task. The screen related to the task may include a graphic object for inputting the task.

The driving mode setting apparatus determines the road type on which the vehicle 10 is driving (S610).

The driving mode setting apparatus may determine any one of a plurality of road types as the road type on which the vehicle 10 is driving, based on the location of the vehicle 10. Here, the plurality of road types may include any one or more of a highway section, a city section, and a suburban section.

The driving mode setting apparatus sets the driving mode of the vehicle 10 based on the occupant's state and the road type (S620).

The driving mode setting apparatus may set the preferred driving mode corresponding to the occupant's state and the road type as the driving mode of the vehicle, based on the pre-stored driving mode map. Here, the driving mode map may be a table defining preferred driving modes corresponding to the occupant's states and road types.

The driving mode setting apparatus may set at least one of a chassis control mode, a longitudinal acceleration/deceleration control level, a lateral acceleration/deceleration control level, and a defensive driving degree based on the driving mode of the vehicle 10.

The driving mode setting apparatus may use at least one graphic object to provide information on the set driving mode to the occupant. The driving mode setting apparatus may control the interface device 130 to display screen related to the driving mode. The screen related to the driving mode may include at least one graphic object. The driving mode setting apparatus may control one or more of a size and a color of at least one graphic object to vary according to the set driving mode.

The respective components of the apparatus or method according to the present disclosure may be implemented as hardware or software, or hardware and software combined. Additionally, the function of each component may be implemented by software and the function by software for each component may be implemented to be executed by a microprocessor.

Various implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs, which are also known as programs, software, software applications, or code, contain instructions for a programmable processor and are stored in a "computer-readable recording medium."

The computer-readable recording medium includes any type of recording device on which data that can be read by a computer system are recordable. Examples of computer-readable recording medium include non-volatile or non-transitory media such as a ROM, CD-ROM, magnetic tape, floppy disk, memory card, hard disk, optical/magnetic disk, storage devices, and the like. The computer-readable recording medium further includes transitory media such as data transmission medium. Further, the computer-readable recording medium can be distributed in computer systems connected via a network, wherein the computer-readable codes can be stored and executed in a distributed mode.

Although the flowchart(s) or timing chart(s) of the present disclosure presents the respective steps thereof as being sequentially performed, it merely instantiates the technical idea of some embodiments of the present disclosure. Therefore, a person having ordinary skill in the pertinent art could incorporate various modifications, additions, and substitutions in practicing the present disclosure by changing the sequence of steps illustrated by the flowchart(s) or timing chart(s) or by performing one or more of the steps thereof in parallel, and hence the steps in the flowchart(s) or timing chart(s) are not limited to the illustrated chronological sequences.

As described above, according to at least one embodiment, the present disclosure can set the driving mode of the vehicle based on the occupant's state and road information, thereby improving the satisfaction of the occupant.

Additionally, according to at least one embodiment, the present disclosure can learn a preferred driving mode of a vehicle occupant corresponding to the occupant's state and road information and reflect the learning in setting the driving mode of the vehicle, thereby providing a personalized autonomous driving function.

Effects of the present disclosure are not limited to the above-mentioned effects, and other unmentioned effects that the present disclosure gives should be clearly understood by those of having ordinary skill in the art from the above-detailed description.

Although exemplary embodiments of the present disclosure have been described for illustrative purposes, those of having ordinary skill in the art would appreciate that various modifications, additions, and substitutions are possible, without departing from the idea and scope of the present disclosure. Therefore, exemplary embodiments of the present disclosure have been described for the sake of brevity and clarity. The scope of the technical idea of the embodiments of the present disclosure is not limited by the illustrations. Accordingly, one of ordinary skill in the art would understand the scope of the present disclosure is not to be limited by the above explicitly described embodiments.

---

REFERENCE NUMERALS

| | |
|---|---|
| 10: vehicle | 110: sensing unit |
| 120: navigation information acquisition unit | |
| 130: interface device | 140: controller |
| 150: storage | 160: autonomous driving system |
| 170: vehicle driving device | |

---

What is claimed is:

1. A method performed by an in-vehicle apparatus for setting a driving mode of a vehicle, the method comprising:
   determining a state of an occupant in the vehicle, wherein the state of the occupant includes a task difficulty corresponding to non-driving task being performed or to be performed by the occupant during autonomous driving of the vehicle, the task difficulty is classified among multiple task difficulties based on a level of concentration required for the occupant to perform the non-driving task, and the level of concentration is predetermined for each non-driving task;
   determining a type of road on which the vehicle is traveling; and
   setting the driving mode of the vehicle based on the task difficulty associated with the level of concentration and the type of the road, wherein setting the driving mode of the vehicle comprises setting a degree of defensive driving of the vehicle based on the task difficulty associated with the level of concentration and the type of the road;
   generating a driving plan based on the driving mode including the degree of defensive driving;
   electrically controlling movement of the vehicle for autonomous driving in accordance with the driving plan; and
   controlling a display to output at least one first graphic object indicating the degree of defensive driving of the vehicle, wherein the controlling includes controlling a size or a length of the at least one first graphic object displayed on the display disposed inside the vehicle to vary according to the degree of defensive driving of the vehicle.

2. The method of claim 1, wherein setting the driving mode of the vehicle comprises:
   setting a preferred driving mode corresponding to the state of the occupant and the type of the road as the driving mode of the vehicle based on a driving mode map that is pre-stored in the vehicle.

3. The method of claim 2, further comprising:
   receiving, via a graphical user interface (GUI), information on the preferred driving mode selected by the occupant, wherein the preferred driving mode corresponds to the state of the occupant and the type of the road; and
   updating the driving mode map by using the state of the occupant, the type of the road, and the preferred driving mode.

4. The method of claim 3, wherein receiving the information on the preferred driving mode comprises:
   controlling the display to output a second graphic object that allow the occupant to select the preferred driving mode from among a plurality of driving modes.

5. The method of claim 1, wherein determining the state of the occupant comprises:
   receiving, via a graphical user interface (GUI), information manually input by the occupant indicating the non-driving task being performed or to be performed by the occupant.

6. The method of claim 5, wherein receiving information about the non-driving task comprises:
   controlling the display to output a third graphic object that allow the occupant to select the non-driving task from among a plurality of tasks.

7. The method of claim 1, wherein determining the type of road comprises:
   determining, among a plurality of road types, the type of road on which the vehicle is traveling based on a location of the vehicle.

8. The method of claim 7, wherein the plurality of road types comprises:
   at least one of a highway section, a city section, or a suburban section.

9. The method of claim 1, wherein setting the driving mode of the vehicle further comprises:
   setting at least one of a chassis control mode of the vehicle, a level of longitudinal acceleration/deceleration control of the vehicle, or a level of lateral acceleration/deceleration control of the vehicle.

10. The method of claim 1, wherein controlling the display further comprises:
   controlling a color of the at least one first graphic object to vary according to the degree of defensive driving applied to the vehicle.

11. The method of claim 1, wherein setting the driving mode of the vehicle comprises:
   determining, from among a plurality of predefined driving modes, the driving mode of the vehicle,
   wherein each of the plurality of predefined driving modes has a control element including the degree of defensive driving, and
   wherein the degree of defensive driving includes a short-distance preceding driving, a medium-distance moderate yield driving, or a long-distance yield driving.

12. The method of claim 11, wherein the long-distance yield driving corresponds to, with respect to the short-distance preceding driving, maintaining a greater distance from other vehicles, allowing more distance for deceleration, or yielding better to surrounding vehicles.

13. The method of claim 1, wherein setting the driving mode comprises:
   determining the driving mode of the vehicle, from among a plurality of predefined preferred driving modes, a preferred driving mode that is retrieved from a stored driving mode map, wherein the stored driving mode map having been updated based on previous driving in which the occupant, under a same state and on a same type of road, selected the preferred driving mode via interaction with a fourth graphic object displayed on a display.

14. The method of claim 1 further includes:

displaying a fifth graphic object including a text or an image indicating the non-driving task, wherein the non-driving task is determined based on data sensed by at least one sensor; and receiving, from the occupant, an input applied to at least one area of the fifth graphic object, wherein the input is for correcting an erroneously determined non-driving task based on the data sensed by the at least one sensor, thereby changing the non-driving task used for classification of the task difficulty.

15. The method of claim 1, wherein controlling the display comprises:

controlling the display to further output a sixth graphic object corresponding to the vehicle and a seventh graphic object corresponding to other vehicle, wherein the first graphic object includes an arrow image arranged with reference to the sixth graphic object and the seventh graphic object.

16. The method of claim 1, wherein the non-driving task is classified into the task difficulty and the road on which the vehicle is traveling is classified into the type of road, and wherein setting the driving mode of the vehicle comprises:

setting the driving mode based on a combination of the task difficulty and the type of road, such that combinations of non-driving tasks and roads classified into the same task difficulty and same type of road are associated with the same driving mode.

17. An apparatus for setting a driving mode of a vehicle, comprising:

one or more processors; and a computer-readable recording medium configured to store instructions that, when executed by the one or more processors, enable the one or more processors to:

determine a state of an occupant inside the vehicle, wherein the state of the occupant includes a task difficulty corresponding to non-driving task being performed or to be performed by the occupant during autonomous driving of the vehicle, the task difficulty is classified among multiple task difficulties based on a level of concentration required to perform the non-driving task, and the level of concentration is predetermined for each non-driving task, determine a type of road on which the vehicle is traveling, set a degree of defensive driving of the vehicle and a driving mode of the vehicle based on the task difficulty associated with the level of concentration and the type of the road, generate a driving plan based on the driving mode including the degree of defensive driving, electrically control movement of the vehicle for autonomous driving in accordance with the driving plan, and control a display to output at least one first graphic object indicating the degree of defensive driving of the vehicle, wherein a size or a length of the at least one first graphic object displayed on the display disposed inside the vehicle is varied according to the degree of defensive driving of the vehicle.

18. The apparatus of claim 17, wherein the instructions further enable the one or more processors to:

store, in the computer-readable recording medium, a driving mode map defining a preferred driving mode corresponding to the state of the occupant and the type of the road; and set, based on the driving mode map, the preferred driving mode that corresponds to the state of the occupant and the type of the road as the driving mode of the vehicle.

19. The apparatus of claim 17, wherein the instructions further enable the one or more processors to provide at least one second graphic object corresponding to the driving mode of the vehicle.

20. A vehicle, comprising:

a sensing unit configured to obtain information on an occupant in the vehicle;

a navigation information acquisition unit configured to obtain navigation information of the vehicle; and one or more processors configured to:

determine a state of the occupant based on the information on the occupant, wherein the state of the occupant includes a task difficulty corresponding to non-driving task being performed or to be performed by the occupant during autonomous driving of the vehicle, the task difficulty is classified among multiple task difficulties based on a level of concentration required for the occupant to perform the non-driving task, and the level of concentration is predetermined for each non-driving task, determine a type of road on which the vehicle is traveling based on the navigation information, set a degree of defensive driving of the vehicle and a driving mode of the vehicle based on the task difficulty associated with the level of concentration and the type of the road, generate a driving plan based on the driving mode including the degree of defensive driving, electrically control movement of the vehicle for autonomous driving in accordance with the driving plan, and control a display to output at least one first graphic object indicating the degree of defensive driving of the vehicle, wherein a size or a length of the at least one first graphic object displayed on the display disposed inside the vehicle is varied according to the degree of defensive driving of the vehicle.

* * * * *